(12) United States Patent
Anderson

(10) Patent No.: US 11,651,074 B2
(45) Date of Patent: May 16, 2023

(54) METHODS AND APPARATUS TO ACCELERATE SECURITY THREAT INVESTIGATION

(71) Applicant: McAfee, LLC, Santa Clara, CA (US)

(72) Inventor: Wayne Anderson, Greeley, CO (US)

(73) Assignee: MUSARUBRA US LLC, San Jose, CA (US)

( * ) Notice: Subject to any disclaimer, the term of this patent is extended or adjusted under 35 U.S.C. 154(b) by 162 days.

(21) Appl. No.: 16/864,102

(22) Filed: Apr. 30, 2020

(65) Prior Publication Data

US 2021/0342442 A1 Nov. 4, 2021

(51) Int. Cl.
*G06F 21/55* (2013.01)
*G06N 20/00* (2019.01)

(52) U.S. Cl.
CPC .......... *G06F 21/554* (2013.01); *G06N 20/00* (2019.01); *G06F 2221/033* (2013.01)

(58) Field of Classification Search
None
See application file for complete search history.

(56) References Cited

U.S. PATENT DOCUMENTS

| | | | |
|---|---|---|---|
| 2003/0164864 A1* | 9/2003 | Aharon | G06T 17/00 345/474 |
| 2018/0307909 A1 | 10/2018 | O'Brien et al. | |
| 2018/0349012 A1* | 12/2018 | Hill | G06K 9/00201 |
| 2019/0260804 A1* | 8/2019 | Beck | H04L 63/101 |
| 2019/0340353 A1 | 11/2019 | Mitelman | |
| 2019/0354388 A1 | 11/2019 | Mitra et al. | |
| 2020/0043008 A1* | 2/2020 | Hrabik | G06Q 20/3821 |
| 2020/0388084 A1* | 12/2020 | Bhushan | G06T 19/20 |

(Continued)

FOREIGN PATENT DOCUMENTS

EP 3772209 A1 2/2021

OTHER PUBLICATIONS

Payer et al, The application of virtual reality for cyber information visualization and investigation, 2015, Springer International Publishing Switzerland, 19 Pages (Year: 2015).*

(Continued)

*Primary Examiner* — Christopher C Harris
(74) *Attorney, Agent, or Firm* — Hanley, Flight & Zimmerman, LLC

(57) ABSTRACT

Methods, apparatus, systems and articles of manufacture are disclosed herein to accelerate security threat investigation. An example apparatus includes a model trainer to train a security investigation model, a game engine to determine a source security software product and a destination security software product of a security threat object, an actions database to store at least one of the previous security response action, the source security software product, the destination security software product, and the security threat object, an action generator to generate at least one suggested security response action in response to a user security investigation action, wherein the suggested security response action is based on an execution of the security investigation model, and a software product controller to adjust a display of the destination security software product of the security threat object in response to the security response action.

18 Claims, 10 Drawing Sheets

(56) References Cited

U.S. PATENT DOCUMENTS

2021/0311542 A1\* 10/2021 Brown .................... G06F 3/011
2021/0349676 A1\* 11/2021 Sommer ................. G06F 3/017

OTHER PUBLICATIONS

Vitual Desktop, "Your PC in VR," [https://www.vrdesktop.net/], Jan. 6, 2020, 4 pages.
Kickstarter, "Nimble Sense: Bring your hands into Virtual Reality and Beyond," [https://twitter.com/DigitalSecArch/status/532367873310609408], Dec. 11, 2004, 12 pages.
Anderson, "Twitter Comments," [https://twitter.com/DigitalSecArch/status/1048016191141203968], Oct. 4, 2018, 2 pages.
Anderson, "Twitter Comments," [https://twitter.com/DigitalSecArch/status/1047918652853571585], Oct. 4, 2018, 2 pages.
PCT/US2021/029941, "International Search Report and Written Opinion", by the International Search Authority, European Patent Office, dated Jun. 10, 2021, pp. 1-14.

\* cited by examiner

METHODS AND APPARATUS TO ACCELERATE SECURITY THREAT INVESTIGATION

FIELD OF THE DISCLOSURE

This disclosure relates generally to security threat investigation, and, more particularly, to methods and apparatus to accelerate security threat investigation.

BACKGROUND

In recent years, the amount of sensitive information and security products has exploded. An increasing number of individuals are using technology products (e.g., personal computers, mobile phones, tablet computers, cloud storage locations, etc.) for both personal use and work. As a result, more security tools and applications have been developed to monitor and manage sensitive information. Security operation center (SOC) analysts work to detect, analyze, and respond to cybersecurity threats using security tools and applications.

Figure 1:
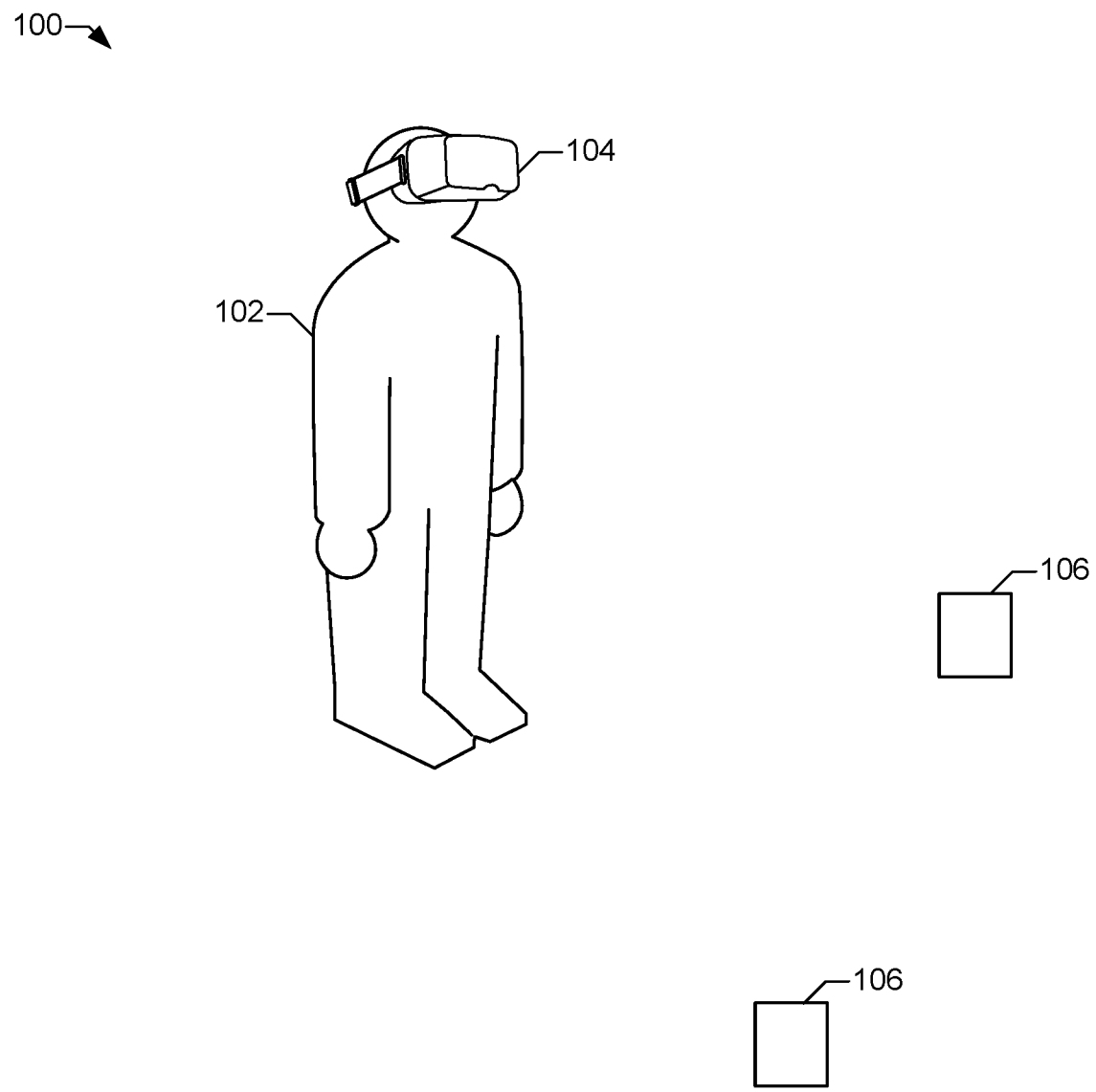
FIG. 1 illustrates an example security operation center (SOC) in which an example SOC analyst, in accordance with this disclosure, detects, analyzes, and responds to cybersecurity threats.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Security operation centers (SOCs) typically identify, analyze, and respond to cybersecurity threats when monitoring networks, servers, databases, etc. In some examples, SOCs include analysts to monitor for cybersecurity threats. SOC analysts can use a plurality of security application software on desktop computers, laptops, tablet computers, etc. to investigate cybersecurity threats.

Traditional SOCs include desktop computers, laptops, etc. with limited screen real estate as well as the conventions of individual products (e.g., individual company security threat applications). These shortcomings of traditional systems result in SOC analysts performing a high degree of copying and pasting between visual displays and individual security software products. Further, the volume of information SOC analysts examine is extremely high. Individual security software products often have application programming interfaces (APIs) and/or well understood and repeated workflows of identified security threats. For example, an SOC analyst moves (e.g., copies and pastes) a specific type of security threat from a first security software product to a second security software product, and the SOC analyst repeatedly performs the same security response action in response to moving the security threat.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Over time, machine learning software can collect and statistically analyze the security response actions of SOC analysts in response to security threats and predict likely security response actions and/or optimize the interface. Methods and apparatus disclosed herein accelerate security threat investigation by implementing SOCs with VR technology and machine learning. In operation, a VR SOC environment greatly expands the amount of visual information displayed to an SOC analyst compared to traditional personal computing devices (e.g., a desktop computer, a laptop, etc.). Additionally, the methods and apparatus disclosed herein train a security investigation model to predict and suggest likely security response actions in response to previous security investigation actions of security threats.

FIG. 1 illustrates an example SOC 100 in which an example SOC analyst 102, in accordance with this disclosure, detects, analyzes, and responds to cybersecurity threats. To investigate cybersecurity threats, the SOC analyst 102 uses an example virtual reality (VR) headset 104. The VR headset 104 increases screen real estate available to the SOC analyst 102, as compared to a traditional desktop computer, laptop, etc. The VR headset 104 can be implemented using any commercial off-the-shelf VR headset or other virtual reality hardware. Additionally or alternatively, the VR headset 104 can be implemented using any device that generates a virtual reality environment. For example, a device that generates a virtual reality environment can be any device that generates a simulated, three-dimensional (3D) environment. For example, the VR headset 104 can be implemented using a smartphone, a personal computer, etc. In some examples, some and/or all processing may be done remotely to the VR headset 104 (e.g., a cloud server to perform cloud computing). To track SOC analyst interaction with security software products, the SOC 100 includes one or more example VR hand trackers 106. The VR hand tracker(s) 106 can be implemented by any commercial off-the-shelf VR hand trackers. The VR hand trackers 106 may be implemented with handheld sensors (e.g., sensors coupled to gloves, etc.), camera sensors (e.g., no handheld sensors), etc. Additionally or alternatively, the VR hand trackers 106 can be implemented with any suitable interface (e.g., joystick, 3D control mouse, etc.) to interact with a 3D VR environment. In the example of FIG. 1, the VR hand trackers 106 wirelessly communicate with the VR headset 104. In some examples, the VR hand trackers 106 communicate with the VR headset 104 via a wired connection.

Figure 2:
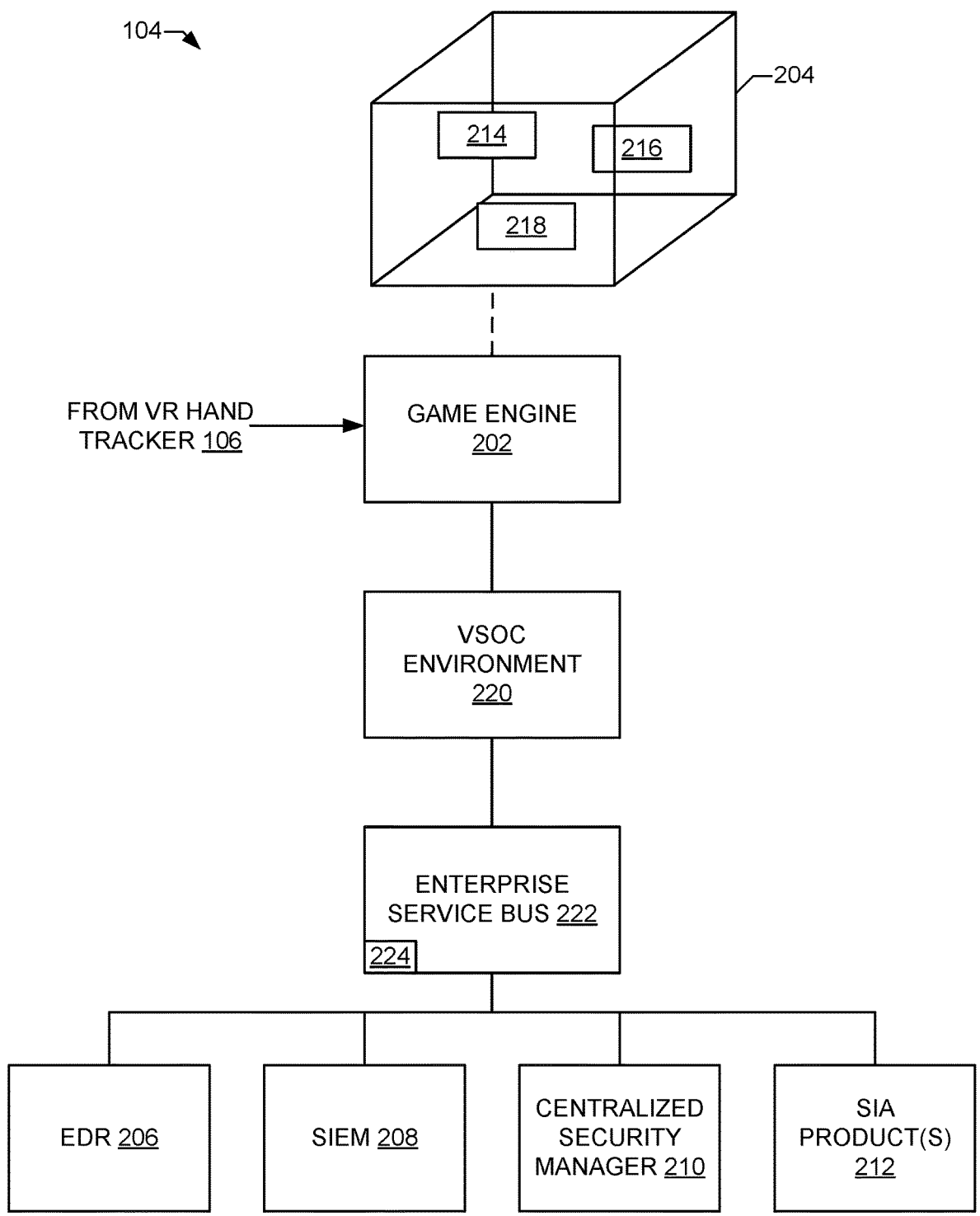
FIG. 2 is a block diagram illustrating an example implementation of the example virtual reality (VR) headset of FIG. 1.

FIG. 2 is a block diagram illustrating an example implementation of the example VR headset 104 of FIG. 1. To produce a SOC VR environment to be displayed in the VR headset 104, the example VR headset 104 interacts with an example game engine 202. As used herein, "produce" refers to the process of rendering a display and/or content of the display (e.g., the example game engine 202 renders the SOC VR environment in the VR headset 104). The example game engine 202 can be implemented using any commercial game engine with the ability to 1) render virtual reality (e.g., 3D) space and 2) dynamically display and create interactions using human inputs, (e.g., from the VR hand trackers 106), such as the Unity Game Engine, the Unreal Engine, etc. In the illustrated example, the VR headset 104 includes a screen. As used herein, "display," "screen," and "display screen" have the same meaning and refer to a structure to visibly convey an image, text, and/or other visual content to a human in response to an electrical control signal.

The example game engine 202 generates visual objects displayed in the example SOC planar environment 204. The example SOC planar environment 204 is divided into a plurality of 3D planes oriented on the plane of vision of the SOC analyst 102. As used herein, "3D planes" refer to a three-dimensional vector of coordinates within the SOC planar environment 204. For example, the SOC planar environment 204 can be displayed to the SOC analyst 102 via the screen of the VR headset 104. In some examples, the VR headset 104 representation includes software security products, such as an example endpoint detection and response product (EDR) 206, an example security information and event management product (SIEM) 208, an example centralized security manager 210, and example security innovation alliance (SIA) product(s) 212. In some examples, the EDR 206 may be implemented by the MCAFEE™ MVISION EDR. Further, the SIEM 208 may be implemented by the MCAFEE™ Enterprise Security Manager (ESM). In some examples, the centralized security manager 210 may be implemented by the MCAFEE™ ePolicy Orchestrator (EPO). Extended security information can be linked or loaded from third party security products 212 (e.g., SIA product(s) 212) through an Enterprise Service Bus 222 to one or more elements of Virtual SOC environment 220 including the SIEM 208, the EDR 206, and/or the centralized security manager 210. In some examples, the Enterprise Service Bus 222 may be implemented by the MCAFEE™ Open Data eXchange Layer (OpenDXL). The example game engine 202 generates an example first visual object 214, an example second visual object 216, and an example third visual object 218 displayed in the SOC planar environment 204. The game engine 202 can generate any number of visual objects to be displayed in the SOC planar environment 204. In the illustrated example, the object(s) 214, 216, 218 are visual representations of security software products (e.g., the EDR 206, the SIEM 208, the centralized security manager 210, and the SIA product(s) 212, etc.).

The game engine 202 receives inputs from the VR hand tracker 106 to perform collision detection. That is, the game engine 202 identifies the object (e.g., a security threat in a security software product), source security software product, and/or destination security software product selected by the SOC analyst 102. In some examples, the SOC analyst 102 identifies a security threat (e.g., a security threat object) in a security software product (e.g., the EDR 206, the SIEM

208, the centralized security manager 210, the SIA product(s) 212, etc.). For example, the VR hand tracker 106 tracks the hand of the example SOC analyst 102. In some examples, the game engine 202 identifies an object selected by the SOC analyst 102 based on gestures (e.g., pointing, pinching, etc.) and the corresponding location of the hand of the SOC analyst 102 within the SOC planar environment 204. For example, the game engine 202 may tag the object based on the 3D planar coordinates. The example game engine 202 connects to machine learning to identify likely objects based on the tagged location, security software product, etc., for example. The game engine 202 performs collision detection to track the SOC analyst 102 interactions using the tagged object(s). For example, the game engine 202 can identify the destination software security product of a security threat object based on the object tag and collision plane. In response to detecting a security investigation action (e.g., a security threat object is selected and moved from one security software product to a second security software product), the game engine 202 estimates the collision location on the opposing plane (e.g., the plane of the second security software product within the example SOC planar environment 204. That is, the game engine 202 identifies the product feature(s) and/or interface(s) corresponding to the collision location, and identifies the data fields most relevant to the tagged object and the second software product through the actions database 308 (described below in connection with FIG. 3). The game engine 202 communicates the security object and/or user interaction using data tagging and configuration information about the object and/or application actions to the security software products (e.g., the EDR 206, the SIEM 208, the centralized security manager 210, and/or the SIA product(s) 212, etc.) to receive and generate new visual frame information based on the interaction.

The example game engine 202 is communicatively connected to an example virtual security operation center (VSOC) environment 220. In some examples, the VSOC environment 220 is implemented by one or more processors of the example VR headset 104. However, examples disclosed herein are not limited thereto. For example, the VSOC environment 220 may be implemented by a processor of a separate device (e.g., a smartphone, a computer, a laptop, etc.). In some other examples, the VSOC environment 220 may be implemented by a cloud-based device (e.g., one or more server(s), processor(s), and/or virtual machine(s)). The example VSOC environment 220 is illustrated in additional detail in connection with FIG. 3. In operation, the VSOC environment 220 generates and executes machine learning models based on interactions from the SOC analyst 102 (e.g., objects identified by the game engine 202, etc.).

To communicate with security software products (e.g., the EDR 206, the SIEM 208, the centralized security manager 210, the SIA product(s) 212, etc.), the VR headset 104 includes an example enterprise service bus (ESB) 222. In some examples, the ESB 222 is implemented by the MCA-FEE™ Data Exchange Layer (DXL). In some other examples, the ESB 222 is implemented by MQ Telemetry Transport (MQTT) and/or any suitable enterprise service bus or application service queue technology. In the illustrated example of FIG. 2, the ESB 222 includes an API 224 to provide additional and/or alternative means for communication between software products (e.g., security software products) and the VSOC environment 220. That is, the ESB 222 enables communication and interaction between one or more security software products of different vendors (e.g., applications that may have different APIs, etc.).

Figure 3:
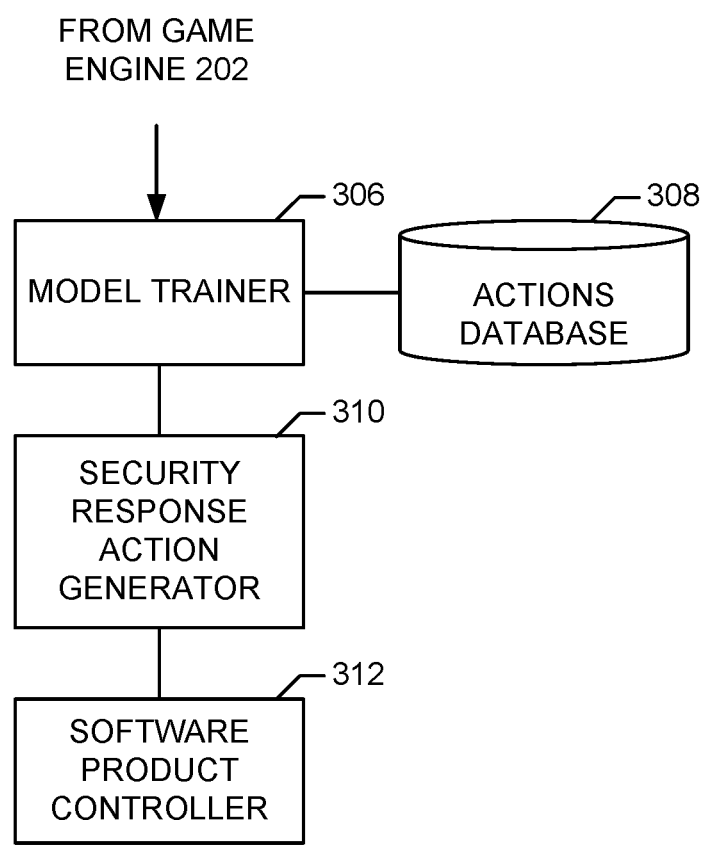
FIG. 3 is a block diagram illustrating an example implementation of the example virtual security operation center (VSOC) environment analysis model of FIG. 2.

FIG. 3 is a block diagram illustrating an example implementation of the VSOC environment 220 of FIG. 2. To statistically analyze and predict likely outcomes of a security threat, the example VSOC environment 220 includes an example model trainer 306. The example model trainer 306 receives inputs (e.g., the identified security threat object, security software product(s), environmental inputs (e.g., network identity traits, risk analysis analytics, etc.), etc.) from the game engine 202. In some examples, the example model trainer 306 saves the security threat object selected by the example SOC analyst 102 and the source and destination security software product to an example actions database 308. In some examples, the actions database 308 saves previous security response actions (e.g., security response actions selected by the example SOC analyst 102). In some examples, the actions database 308 may include logic and metadata relationships loaded or extended by one or more vendors for the applications in the example VSOC environment 220. The example actions database 308 of the illustrated example of FIG. 3 is implemented by any memory, storage device and/or storage disc for storing data such as, for example, flash memory, magnetic media, optical media, solid state memory, hard drive(s), thumb drive(s), etc. Furthermore, the data stored in the example actions database 308 may be in any data format such as, for example, binary data, comma delimited data, tab delimited data, structured query language (SQL) structures, etc. While, in the illustrated example, the actions database 308 is illustrated as a single device, the example actions database and/or any other data storage devices described herein may be implemented by any number and/or type(s) of memories. The example model trainer 306 analyzes the security threat object, the source security software product, and the destination security software product over time to develop a security investigation model.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined.

If the feedback indicates that the accuracy of the deployed model is less than a threshold or other criterion, training of an updated model can be triggered using the feedback and an updated training data set, hyperparameters, etc., to generate an updated, deployed model.

To generate suggested security response actions based on the security investigation model, the example VSOC environment 220 includes an example security response action generator 310. In some examples, the example security response action generator 310 executes the example security investigation model generated by the example model trainer 306, which predicts a plurality of likely security response actions an example SOC analyst 102 will perform in response to a security investigation action (e.g., moving a security threat object from one security software product to a second security software product).

To adjust a software product (e.g., a security software product) in the example SOC planar environment 204, the example VSOC environment 220 includes an example software product controller 312. In some examples, the software product controller 312 resizes or updates a display of the security software product (e.g., makes it larger, or changes focus frames within the software product) in response to the SOC analyst 102 selecting a suggested security response action generated from the example security response action generator 310. For example, in response to the SOC analyst 102 selecting a suggested security response action of a security software product, the software product controller 312 increases the display of the security software product to be full screen (e.g., occupies the entire screen of the VR headset 104). Additionally or alternatively, the software product controller 312 rotates the display (e.g., the SOC planar environment 204 of FIG. 2) to center the security software product. In some examples, the software product controller 312 rotates the display of the SOC planar environment 204, adjust the order of the display of security software product(s), bring forward and/or send back the display of security software product(s), etc.

In operation, the SOC 100 includes an SOC analyst 102 and a VR headset 104. The VR headset 104 displays a SOC planar environment 204 including a first visual object 214, a second visual object 216, and a third visual object 218 (e.g., displays of the EDR 206, the SIEM 208, the centralized security manager 210, and/or the SIA product(s) 212, etc.). The VR headset 104 includes a VSOC environment 220 to detect a security threat object investigated by the SOC analyst 102 (e.g., identified in a first security software product and moved to a second security software product). The VR headset 104 executes a security investigation model to generate one or more suggested security response actions. The VR headset 104 increases the display of the security software product associated with the security response action in response to the SOC analyst 102 selecting a suggested security response action.

While an example manner of implementing the VR headset 104 of FIG. 1 is illustrated in FIG. 2, one or more of the elements, processes and/or devices illustrated in FIG. 2 may be combined, divided, re-arranged, omitted, eliminated and/or implemented in any other way. Further, the example game engine 202, the example SOC planar environment 204, the example EDR 206, the example SIEM 208, the example centralized security manager 210, the example SIA product(s) 212, the example first visual object 214, the example second visual object 216, the example third visual object 218, the example VSOC environment 220, the example ESB 222, the example API 224 and/or, more generally, the example VR headset 104 of FIG. 1 may be implemented by hardware, software, firmware and/or any combination of hardware, software and/or firmware. Thus, for example, any of the example game engine 202, the example SOC planar environment 204, the example EDR 206, the example SIEM 208, the example centralized security manager 210, the example SIA product(s) 212, the example first visual object 214, the example second visual object 216, the example third visual object 218, the example VSOC environment 220, the example ESB 222, the example API 224 and/or, more generally, the example VR headset 104 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example game engine 202, the example SOC planar environment 204, the example EDR 206, the example SIEM 208, the example centralized security manager 210, the example SIA product(s) 212, the example first visual object 214, the example second visual object 216, the example third visual object 218, the example VSOC environment 220, the example ESB 222, the example API 224 is/are hereby expressly defined to include a non-transitory computer readable storage device or storage disk such as a memory, a digital versatile disk (DVD), a compact disk (CD), a Blu-ray disk, etc. including the software and/or firmware. Further still, the example VR headset 104 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
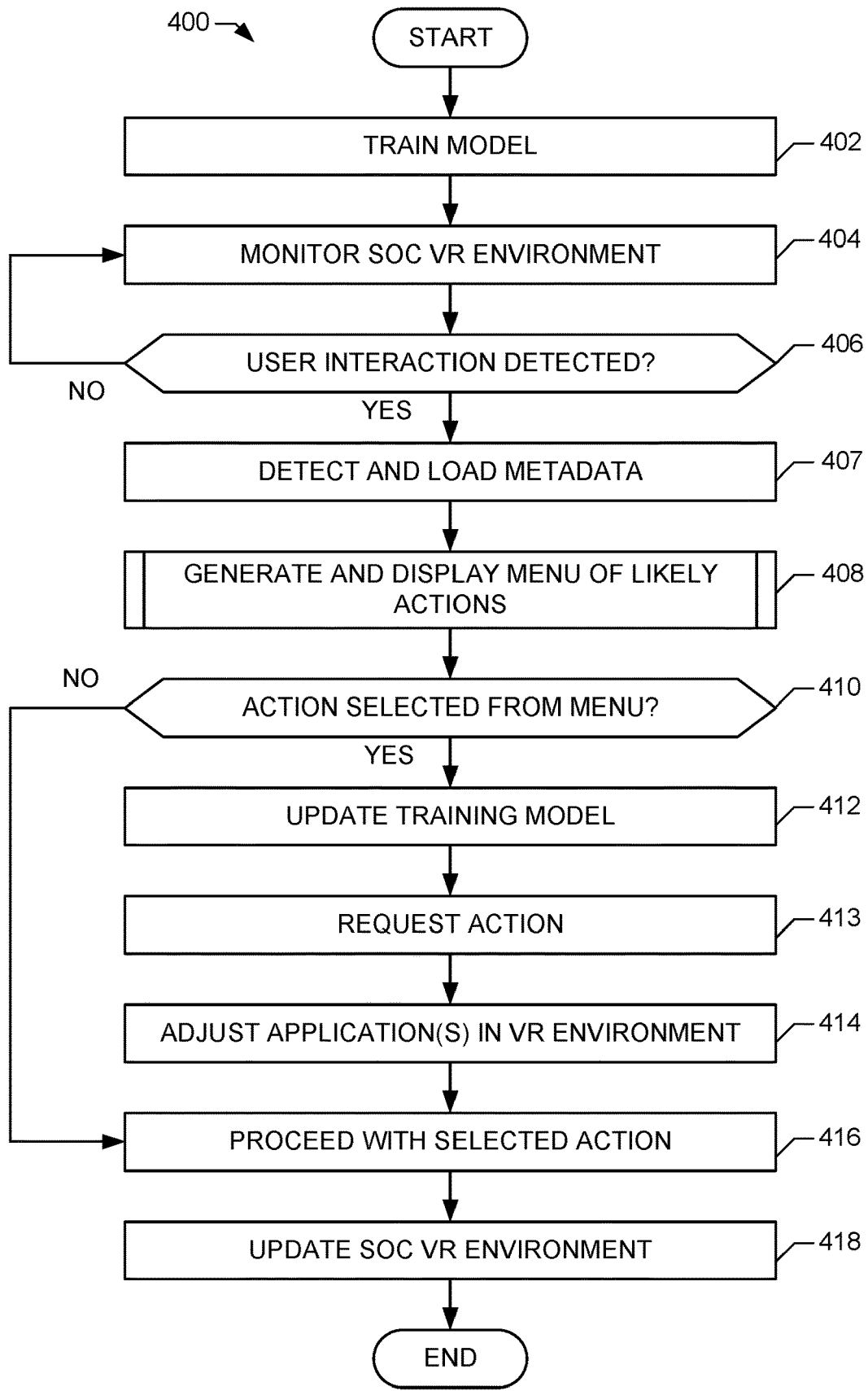
FIG. 4 is a flowchart representative of an example process that may be executed to implement the example SOC to detect, analyze, and respond to cybersecurity threats.
Figure 5:
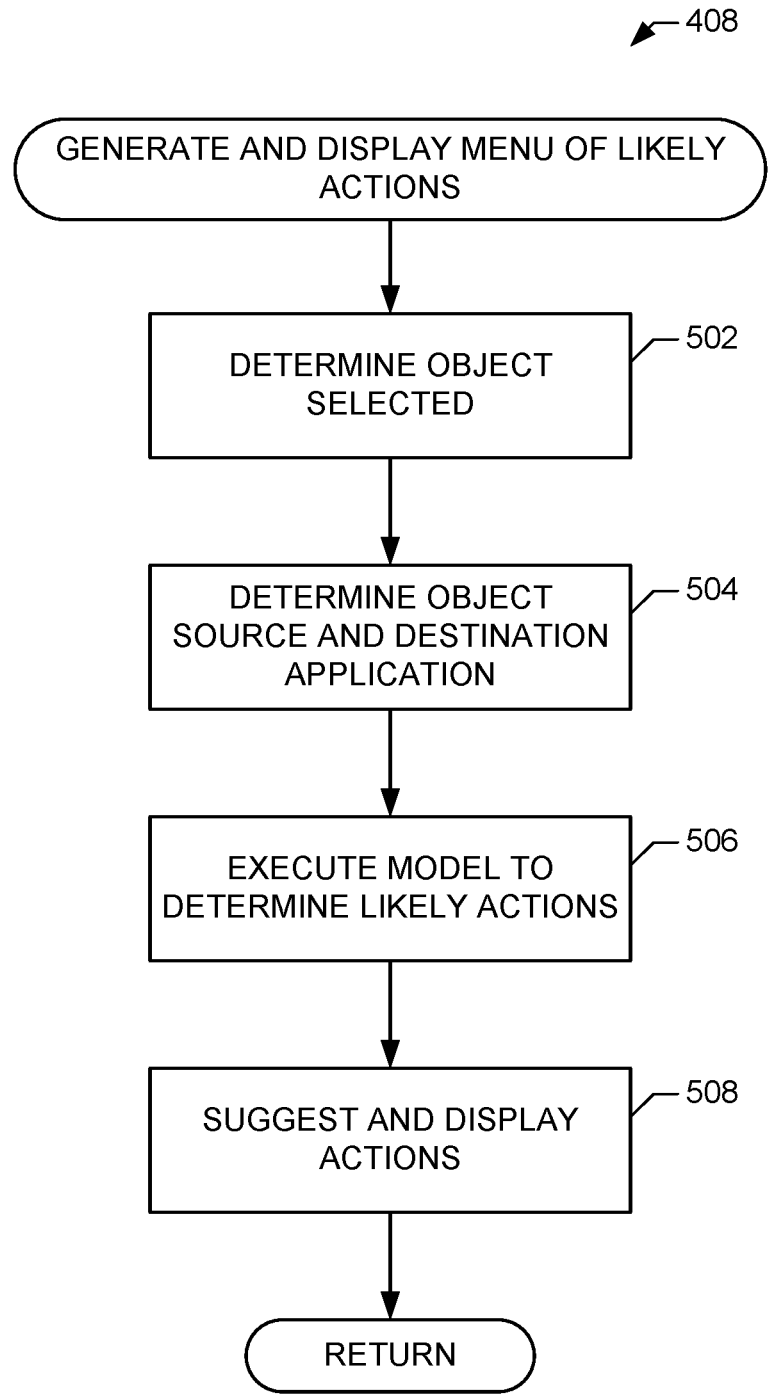
FIG. 5 is a flowchart representative of an example process that may be executed to implement the security response action generator of FIG. 3 to generate a suggested security response action.

A flowchart representative of example hardware logic, machine readable instructions, hardware implemented state machines, and/or any combination thereof for implementing the example VR headset 104 of FIG. 1 is shown in FIGS. 4-5. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 4-5, many other methods of implementing the example VR headset 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a field-programmable gate array (FPGA), an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example program 400 of FIG. 4 begins at block 402, where the example model trainer 306 of FIG. 3 trains the security investigation model. In some examples, the training samples include a security threat object (e.g., security threat) selected by the example SOC analyst 102. Further, the training samples may also include the source security software product of the selected security threat object and the destination security software product of the selected security threat object.

The example game engine 202 monitors the example SOC VR environment (block 404). In some examples, the game engine 202 monitors the SOC VR environment for interaction from the example SOC analyst 102 via the example VR hand tracker 106. For example, interactions from the SOC analyst 102 may include opening a new security software product, closing a security software product, and/or moving a security threat object between one or more security software products (e.g., a security investigation action).

The example game engine 202 determines whether a user interaction is detected (block 406). If the example game engine 202 determines that no user interaction is detected (e.g., block 406 returns a result of NO), the game engine 202 returns to block 404 and continues monitoring the SOC VR environment. If the example game engine 202 determines that a user interaction is detected (e.g., block 406 returns a result of YES), the example game engine 202 detects and loads metadata of the object corresponding to the user interaction (block 407). For example, the game engine 202 loads metadata (e.g., metadata stored in the actions database 308 of FIG. 3) of the object of a security software product selected by the user. The VSOC environment 220 generates and displays a menu of likely security response actions (block 408). An example implementation of generating and displaying a menu of likely security response actions (block 408) is described in further detail in connection with FIG. 5 below.

The example game engine 202 determines whether the SOC analyst 102 selected a likely security response action (e.g., an action generated from the execution of the example security investigation model) from the hub menu (block 410). If the game engine 202 determines the SOC analyst 102 did not select a likely security response action from the menu (e.g., block 410 returns a result of NO), the VSOC environment 220 proceeds with the selected security response action (block 416). If the game engine 202 determines the SOC analyst 102 did select a likely security response action from the hub menu (e.g., block 410 returns a result of YES), the example model trainer 306 updates the security investigation model (block 412). In some examples, the model trainer 306 saves and associates the selected security response action with the previously saved security threat object, source security software product, and destination security software product in the example actions database 308. The game engine 202 requests the action (e.g., a likely security response action) (block 413). For example, the game engine 202 prepares a translation of the selected object and/or an API request corresponding to the selected action.

The example software product controller 312 adjusts security software product(s) in the example SOC planar environment 204 (block 414). In some examples, the software product controller 312 increases the size of the destination security software product of the selected security threat object. In further examples, the software product controller 312 increases the size of the security software product associated with the security response action selected by the SOC analyst 102.

The example VSOC environment 220 proceeds with the selected security response action (block 416) of the SOC analyst 102. In some examples, the example VSOC environment 220 communicates with the game engine 202 to use the API(s) or product feature(s) that correspond to the selected security response action and/or security software product in the underlying interface. The game engine 202 updates the SOC environment based on the selected action (block 418). For example, the game engine 202 updates the operating state of the SOC planar environment 204 (e.g., the display of the visual objects 214, 216, 218). Control exits from the example program of FIG. 4.

As mentioned above, an example implementation of the subprocess 408 of FIG. 4 is illustrated in FIG. 5 to implement the example VR headset 104 to generate and display a menu of likely security response actions. The subprocess 408 begins at block 502, where the example game engine 202 determines the security threat object selected. In some examples, the game engine 202 determines whether the security threat object is an internet protocol (IP) address, an alert, and/or a configuration item. The example game engine 202 is communicatively connected to the example model trainer 306, which saves the detected security threat object in the example actions database 308.

The example game engine 202 determines the security threat object's source and destination security software product (e.g., the example EDR 206, the example SIEM 208, the example centralized security manager 210, the example SIA product(s) 212, etc.) (block 504). In some examples, when the security threat object is selected through a haptic action (e.g., grab, touch, etc.) and is moved through 3D space by the SOC analyst 102, the game engine 202 detects the collision with another projected 3D plane. The game engine 202 estimates the collision location on the opposing plane, and identifies the security software product (e.g., product feature(s), interface(s), etc.) which corresponds to that collision location. The game engine 202 is communicatively connected to the example model trainer 306, which saves the source and/or destination security software product to the example actions database 308.

The example security response action generator 310 executes the security investigation model to generate likely security response actions (block 506). In some examples, the security response action generator 310 receives the security investigation model from the example model trainer 306 (e.g., security investigation model trained in block 402 of FIG. 4). The security response action generator 310 also receives the detected security threat object, source security software product, and/or destination security software product saved in the example actions database 308. The security threat object, source security software product, and/or destination security software product may be used by the security response action generator 310 to execute the security investigation model and generate suggested security response actions. In some examples, the suggested security response actions are actions that a SOC analyst 102 has previously performed in response to a security investigation action (e.g., selecting the same security threat object from the source and/or destination security software product).

The example security response action generator 310 suggests and displays the likely security response actions to the example SOC analyst 102 via the example VR headset 104 (block 508). In some examples, the likely security response actions can be displayed in 3D space (e.g., in the example SOC planar environment 204) as a hub menu. The example VSOC environment 220 returns to the example program 400 of FIG. 4.

Figure 6:
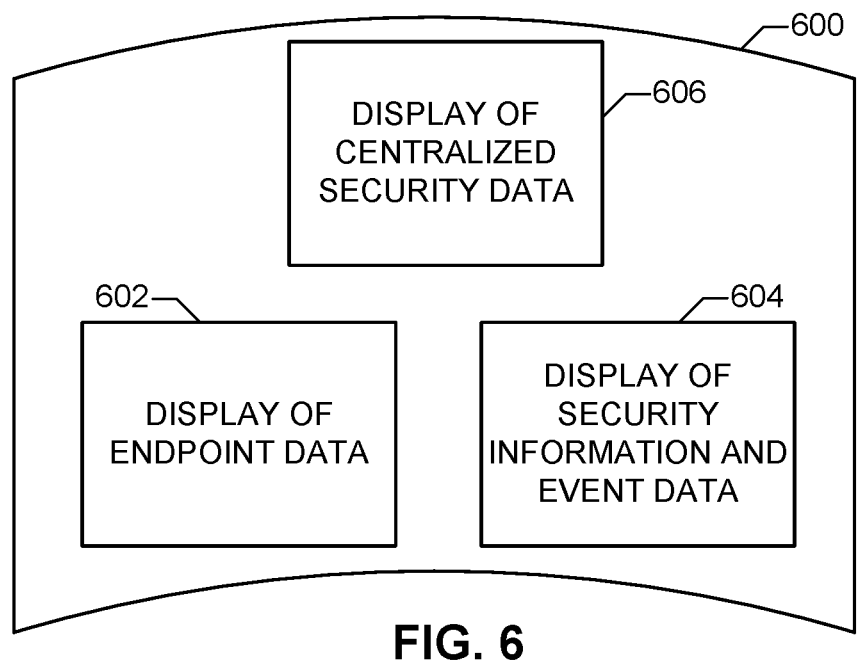
FIG. 6 is an example block diagram illustrating an example SOC VR environment.

FIGS. 6-10 are example block diagrams illustrating an example SOC threat investigation performed by the example SOC analyst 102 in the example SOC planar environment 204. FIG. 6 illustrates an example SOC VR environment 600. In some examples, the SOC VR environment 600 is displayed to the example SOC analyst 102 via the example VR headset 104. In the illustrated example of FIG. 6, the SOC VR environment 600 contains an example display of endpoint data 602. In some examples, the display of endpoint data 602 displays data from the example EDR 206 of FIG. 2. The example SOC VR environment 600 also contains an example display of security information and event data 604. In some examples, the display of security information and event data 604 corresponds to data from the SIEM 208 of FIG. 2. The example SOC VR environment 600 also contains an example display of centralized security data 606. In some examples, the display of centralized security data 606 corresponds to data from the example centralized security manager 210 of FIG. 2.

Figure 7:
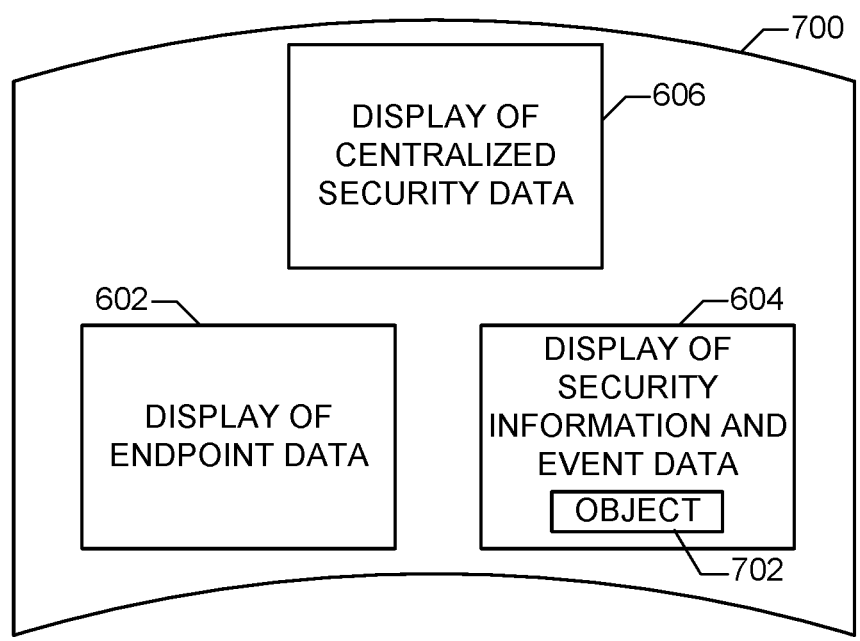
FIG. 7 is an example block diagram illustrating the example SOC VR environment of FIG. 6 identifying a security threat.

FIG. 7 illustrates an example SOC VR environment 700. In the illustrated example of FIG. 7, the SOC VR environment 700 includes the example display of endpoint data 602, the example display of security information and event data 604, and the example display of centralized security data 606. The example SOC VR environment 700 includes an example object 702 (e.g., a security threat object identified by the example SOC analyst 102) in the example display of security information and event data 604.

Figure 8:
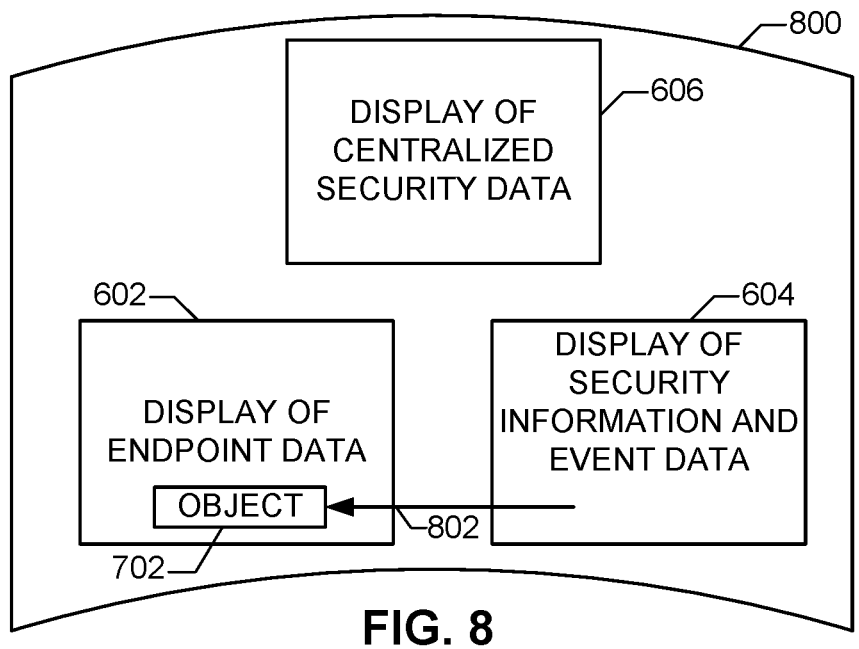
FIG. 8 is an example block diagram illustrating the example SOC VR environment of FIG. 6 with a SOC analyst interaction in response to the security threat of FIG. 7.

FIG. 8 illustrates an example SOC VR environment 800. In the illustrated example of FIG. 8, the SOC VR environment 800 includes the example display of endpoint data 602, the example display of security information and event data 604, and the example display of centralized security data 606. The example SOC VR environment 800 includes an example user security investigation action 802 performed by the example SOC analyst 102, for example. In the illustrated example of FIG. 8, the SOC analyst 102 identified object 702 (e.g., in FIG. 7) and performs the user security investigation action 802 to move the object 702 from the example display of security information and event data 604 to the example display of endpoint data 602.

Figure 9:
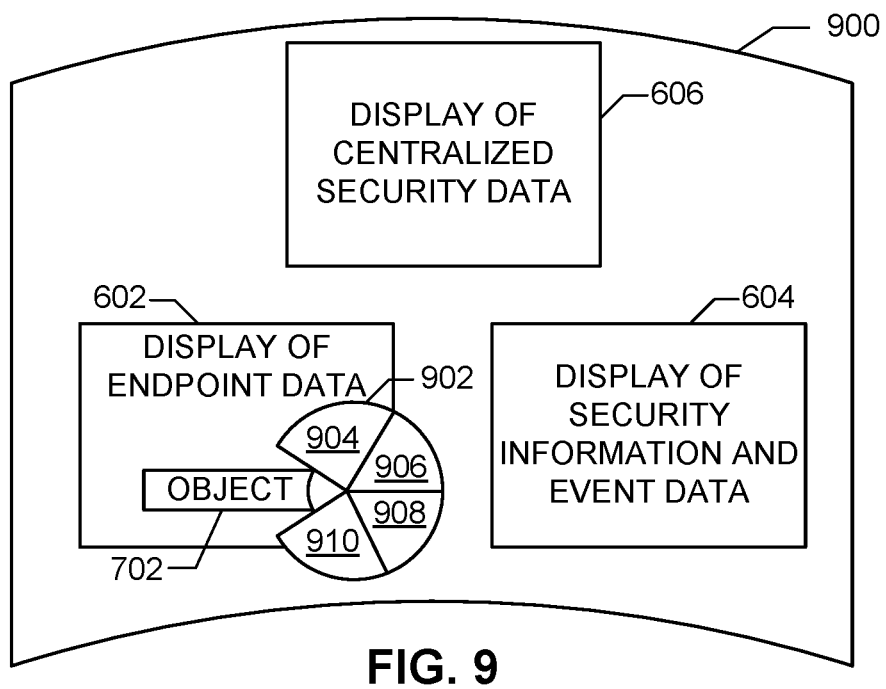
FIG. 9 is an example block diagram illustrating the example SOC VR environment of FIG. 6 with a menu of suggested security response actions in response to the SOC analyst interaction of FIG. 8.

FIG. 9 illustrates an example SOC VR environment 900. In the illustrated example of FIG. 9, the SOC VR environment 900 includes the example display of endpoint data 602, the example display of security information and event data 604, and the example display of centralized security data 606. The illustrated example of FIG. 9 also includes an example hub menu 902 of suggested security response actions the SOC analyst 102 may select from in response to the user security investigation action 802 of FIG. 8. In some examples, the hub menu 902 is generated by executing the security investigation model (e.g., block 408 of FIG. 4). The example hub menu 902 includes a first suggested security response action 904, a second suggested security response action 906, a third suggested security response action 908, and a fourth suggested security response action 910. While the illustrated example of FIG. 9 includes four suggested security response actions 904-910, examples disclosed herein are not limited thereto. The example hub menu 902 may include any suitable number of suggested security response actions.

Figure 10:
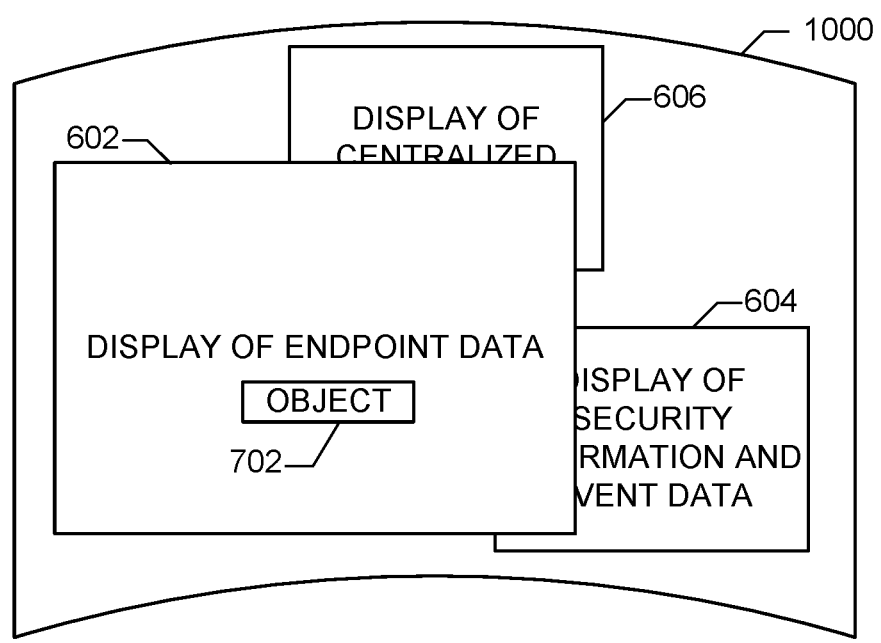
FIG. 10 is an example block diagram illustrating the example SOC VR environment of FIG. 6 resizing a security application in response to the SOC analyst selecting a suggested security response action.

FIG. 10 illustrates an example SOC VR environment 1000. In the illustrated example of FIG. 10, the SOC VR environment 1000 includes the example display of endpoint data 602, the example display of security information and event data 604, and the example display of centralized security data 606. In some examples, the illustrated example of FIG. 10 occurs in response to the SOC analyst 102 selecting one of the suggested security response actions (e.g., suggested security response actions 904-910) from the example hub menu 902 of FIG. 9. For example, the example display of endpoint data 602 of FIG. 10 is larger in size with respect to the example display of endpoint data 602 illustrated in FIGS. 6-9 (e.g., block 414 of FIG. 4). In further examples, the example display of security information and event data 604 and the example display of centralized security data 606 may be additionally or alternatively resized (e.g., increased in size, decreased in size, etc.).

Figure 11:
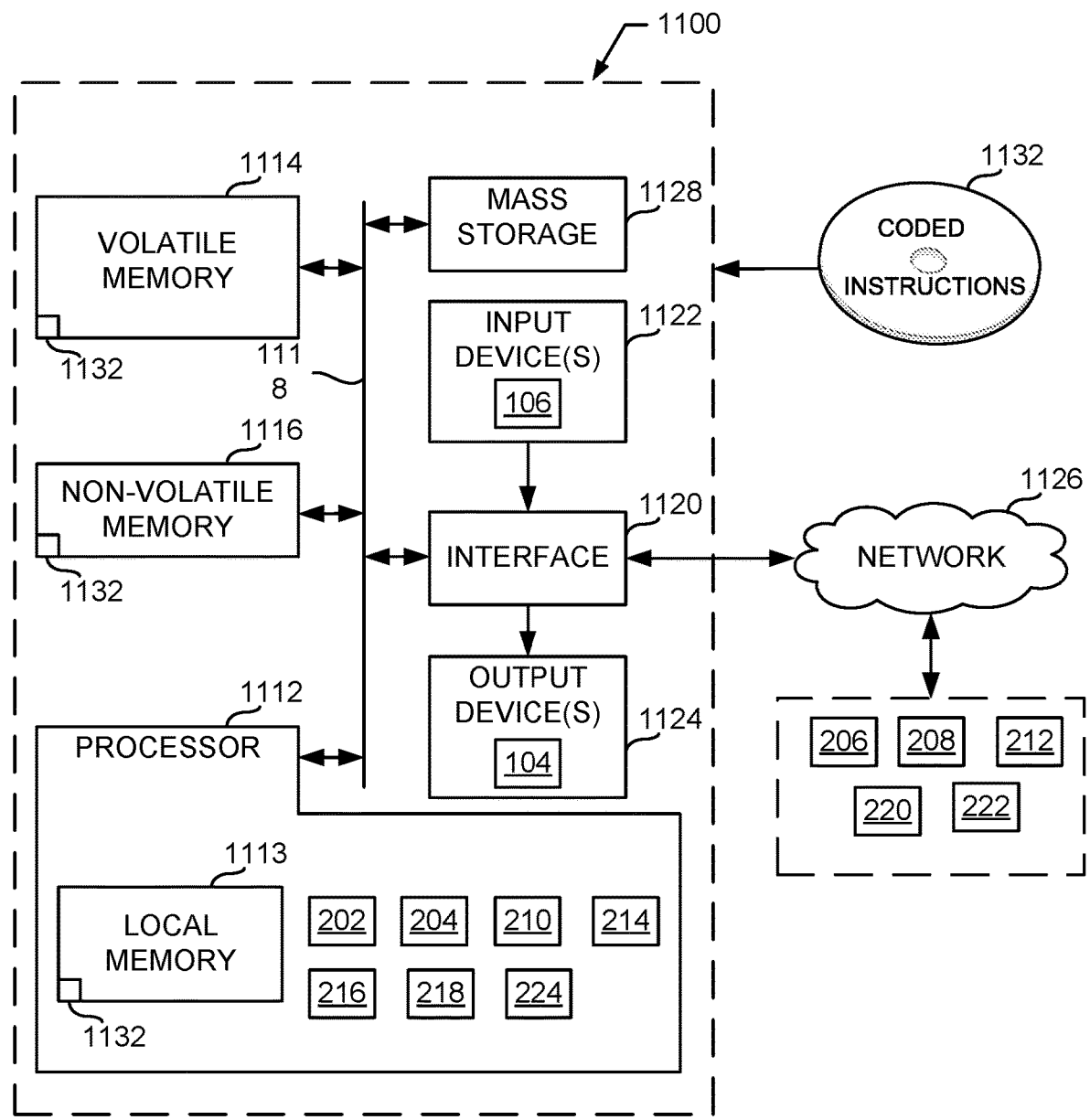
FIG. 11 is a block diagram of an example processing platform structured to execute the instructions of FIGS. 4-5 to implement the SOC of FIG. 1.

FIG. 11 is a block diagram of an example processor platform 1100 structured to execute the instructions of FIGS. 4-5 to implement the example VR headset 104 of FIGS. 2-3. The processor platform 1100 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example game engine 202, the example SOC planar environment 204, the example centralized security manager 210, the example first visual object 214, the example second visual object 216, the example third visual object 218, and the example API 224.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-sight wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIGS. 4-5 may be stored in the mass storage device 1128, in the volatile memory 1114, in the non-volatile memory 1116, and/or on a removable non-transitory computer readable storage medium such as a CD or DVD.

Figure 12:
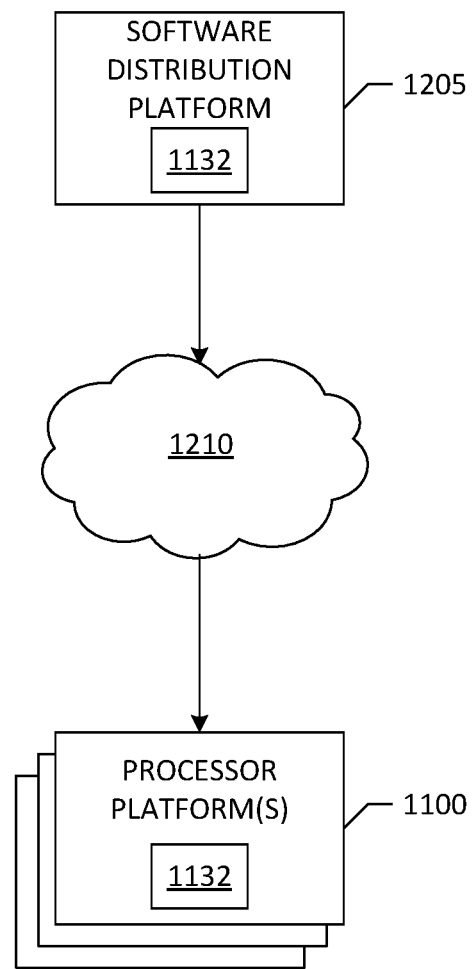
FIG. 12 is a block diagram of an example software distribution platform to distribute software (e.g., software corresponding to the example computer readable instructions of FIGS. 4-5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1132 of FIG. 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1132 of FIG. 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1132, which may correspond to the example computer readable instructions 1132 of FIGS. 4-5, as described above. The one or more servers of the example software distribution platform 1205 are in communication with a network 1210, which may correspond to any one or more of the Internet and/or any of the example networks 1126 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1132 from the software distribution platform 1205. For example, the software, which may correspond to the example computer readable instructions 1132 of FIG. 4-5, may be downloaded to the example processor platform 1100, which is to execute the computer readable instructions 1132 to implement the example VR headset 104. In some example, one or more servers of the software distribution platform 1205 periodically offer, transmit, and/or force updates to the software (e.g., the example computer readable instructions 1132 of FIGS. 4-5) to ensure improvements, patches, updates, etc. are distributed and applied to the software at the end user devices.

From the foregoing, it will be appreciated that example methods, apparatus and articles of manufacture have been disclosed that accelerate security threat investigation. The disclosed methods, apparatus and articles of manufacture improve the efficiency of using a computing device by training and executing a security investigation model. The VR environment increases screen real estate and, thus, greatly expands visual information available to an SOC analyst. Additionally, the VR environment facilitates an increase in physical movement (e.g., hands and/or arms can move and rotate through expansive space) compared to use of traditional desktop computer, laptop, etc. The security investigation model, when executed, generates suggested security response actions to SOC analysts to accelerate security threat hunting. The disclosed methods, apparatus and articles of manufacture are accordingly directed to one or more improvement(s) in the functioning of a computer.

Example methods, apparatus, systems, and articles of manufacture to accelerate security threat investigation are disclosed herein. Further examples and combinations thereof include the following:

Example 1 includes an apparatus to accelerate security threat investigation, the apparatus comprising a model trainer to train a security investigation model, the security investigation model based at least on a previous security response action in response to a security threat, a game engine to determine a source security software product and a destination security software product of a security threat object, an actions database to store at least one of the previous security response action, the source security software product, the destination security software product, and the security threat object, an action generator to generate at least one suggested security response action in response to a user security investigation action, wherein the suggested security response action is based on an execution of the security investigation model, and a software product controller to adjust a display of the destination security software product of the security threat object in response to the security response action.

Example 2 includes the apparatus of example 1, wherein the user security investigation action is to include moving at least one security threat object from the source security software product to the destination security software product.

Example 3 includes the apparatus of example 2, wherein the source security software product and/or the destination security software product include at least one of an endpoint detection and response product, a security information and event management product, a centralized security manager, and a security innovation alliance product.

Example 4 includes the apparatus of example 1, wherein the source security software product and the destination security software product are to be displayed in a virtual reality (VR) environment for a user.

Example 5 includes the apparatus of example 1, wherein the game engine is to tag the security threat object selected by a user.

Example 6 includes the apparatus of example 1, wherein the game engine is to detect the security threat object in at least one of security software products selected by a user.

Example 7 includes the apparatus of example 1, wherein the action generator is to execute the security investigation model based on at least one of the security threat object, the source security software product of the security threat object, and the destination security software product of the security threat object.

Example 8 includes a method comprising training a security investigation model, the security investigation model based at least on a previous security response action in response to a security threat, determining a source security software product and a destination security software product of a security threat object, storing at least one of the previous security response action, the source security software product, the destination security software product, and the security threat object, generating at least one suggested security response action in response to a user security investigation action, wherein the suggested security response action is based on an execution of the security investigation model, and adjusting a display of the destination security software product of the security threat object in response to the security response action.

Example 9 includes the method of example 8, wherein the user security investigation action is to include moving at least one security threat object from the source security software product to the destination security software product.

Example 10 includes the method of example 9, wherein the source security software product and/or the destination security software product include at least one of an endpoint detection and response product, a security information and event management product, a centralized security manager, and a security innovation alliance product.

Example 11 includes the method of example 8, wherein the source security software product and the destination security software product are to be displayed in a virtual reality (VR) environment for a user.

Example 12 includes the method of example 8, further including tagging the security threat object selected by a user.

Example 13 includes the method of example 8, further including detecting the security threat object in at least one of security software products selected by a user.

Example 14 includes the method of example 8, further including executing the security investigation model based on at least one of the security threat object, the source security software product of the security threat object, and the destination security software product of the security threat object.

Example 15 includes at least one non-transitory computer readable medium comprising instructions that, when executed, cause at least one processor to at least train a security investigation model, the security investigation model based at least on a previous security response action in response to a security threat, determine a source security software product and a destination security software product of a security threat object, store at least one of the previous security response action, the source security software product, the destination security software product, and the security threat object, generate at least one suggested security response action in response to a user security investigation action, wherein the suggested security response action is based on an execution of the security investigation model, and adjust a display of the destination security software product of the security threat object in response to the security response action.

Example 16 includes the at least one non-transitory computer readable medium of example 15, wherein the user security investigation action is to include moving at least one security threat object from the source security software product to the destination security software product.

Example 17 includes the at least one non-transitory computer readable medium of example 16, wherein the source security software product and/or the destination security software product include at least one of an endpoint detection and response product, a security information and event management product, a centralized security manager, and a security innovation alliance product.

Example 18 includes the at least one non-transitory computer readable medium of example 15, wherein the source security software product and the destination security software product are to be displayed in a virtual reality (VR) environment for a user.

Example 19 includes the at least one non-transitory computer readable medium of example 15, wherein the instructions, when executed, cause the at least one processor to tag the security threat object selected by a user.

Example 20 includes the at least one non-transitory computer readable medium of example 15, wherein the instructions, when executed, cause the at least one processor to detect the security threat object in at least one of security software products selected by a user.

Example 21 includes the at least one non-transitory computer readable medium of example 15, wherein the instructions, when executed, cause the at least one processor to execute the security investigation model based on at least one of the security threat object, the source security software product of the security threat object, and the destination security software product of the security threat object.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to accelerate security threat investigation, the apparatus comprising:
   at least one memory;
   machine-readable instructions; and
   processor circuitry to execute the machine-readable instructions to:
   cause display of a virtual security operations center in a virtual environment, the virtual security operations center to include visual representations of a plurality of security software products, wherein at least one of the plurality of security software products includes a security threat object, the security threat object selectable by a user of the virtual security operations center;
   generate a plurality of suggested security response actions in response to a user interaction with a visual representation of the security threat object, the user interaction to cause the visual representation of the security threat object to at least move from a visual representation of a first security software product to a visual representation of a second security software product, the plurality of suggested security response actions to be generated based on an execution of a security investigation model and inputs to the security investigation model, the inputs including at least the first security software product, the second security software product, and the security threat object, the plurality of suggested security response actions to be displayed as menu options selectable by the user; and
   cause adjustment to display of the visual representation of the second security software product in response to a selection of one of the plurality of suggested security response actions.

2. The apparatus of claim 1, wherein the user interaction is to be implemented by one or more gestures performed by a user via one or more hand tracking devices.

3. The apparatus of claim 1, wherein the plurality of security software products include at least one of an endpoint detection and response product, a security information and event management product, a centralized security manager, and a security innovation alliance product.

4. The apparatus of claim 1, wherein the processor circuitry is to tag a location of the visual representation of the security threat object within the virtual environment in response to a user selecting the security threat object via the user interaction.

5. The apparatus of claim 1, wherein the processor circuitry is to detect a collision of the visual representation of the security threat object with the visual representation of the second security software product, the collision to further cause the plurality of suggested security response actions to be generated.

6. The apparatus of claim 5, wherein the processor circuitry is to execute the security investigation model based on at least one of the security threat object, the first security software product, the second security software product, and the collision.

7. A method comprising:
  causing display of a virtual security operations center in a virtual environment, the virtual security operations center to include visual representations of a plurality of security software products, wherein at least one of the plurality of security software products includes a security threat object, the security threat object selectable by a user of the virtual security operations center;
  generating a plurality of suggested security response actions in response to a user interaction with a visual representation of the security threat object, the user interaction to cause the visual representation of the security threat object to at least move from a visual representation of a first security software product to a visual representation of a second security software product, the plurality of suggested security response actions to be generated based on an execution of a security investigation model and inputs to the security investigation model, the inputs including at least the first security software product, the second security software product, and the security threat object, the plurality of suggested security response actions to be displayed as menu options selectable by the user; and
  causing adjustment to display of the visual representation of the second security software product in response to a selection of one of the plurality of suggested security response actions.

8. The method of claim 7, wherein the user interaction is to be implemented by one or more gestures performed by a user via one or more hand tracking devices.

9. The method of claim 7, wherein the plurality of security software products include at least one of an endpoint detection and response product, a security information and event management product, a centralized security manager, and a security innovation alliance product.

10. The method of claim 7, further including tagging a location of the visual representation of the security threat object within the virtual environment in response to a user selecting the security threat object via the user interaction.

11. The method of claim 7, further including detecting a collision of the visual representation of the security threat object with the visual representation of the second security software product, the collision to further cause the plurality of suggested security response actions to be generated.

12. The method of claim 11, further including executing the security investigation model based on at least one of the security threat object, the first security software product, the second security software product, and the collision.

13. At least one non-transitory computer readable medium comprising instructions that, when executed, cause at least one processor to at least:
  cause display of a virtual security operations center in a virtual environment, the virtual security operations center to include visual representations of a plurality of security software products, wherein at least one of the plurality of security software products includes a security threat object, the security threat object selectable by a user of the virtual security operations center;
  generate a plurality of suggested security response actions in response to a user interaction with a visual representation of the security threat object, the user interaction to cause the visual representation of the security threat object to at least move from a visual representation of a first security software product to a visual representation of a second security software product, the plurality of suggested security response actions to be generated based on an execution of a security investigation model and inputs to the security investigation model, the inputs including at least the first security software product, the second security software product, and the security threat object, the plurality of suggested security response actions to be displayed as menu options selectable by the user; and
  cause adjustment to display of the visual representation of the second security software product in response to a selection of one of the plurality of suggested security response actions.

14. The at least one non-transitory computer readable medium of claim 13, wherein the user interaction is to be implemented by one or more gestures performed by a user via one or more hand tracking devices.

15. The at least one non-transitory computer readable medium of claim 13, wherein the plurality of security software products include at least one of an endpoint detection and response product, a security information and event management product, a centralized security manager, and a security innovation alliance product.

16. The at least one non-transitory computer readable medium of claim 13, wherein the instructions, when executed, cause the at least one processor to tag a location of the visual representation of the security threat object within the virtual environment in response to a user selecting the security threat object via the user interaction.

17. The at least one non-transitory computer readable medium of claim 13, wherein the instructions, when executed, cause the at least one processor to detect a collision of the visual representation of the security threat object with the visual representation of the second security software product, the collision to further cause the plurality of suggested security response actions to be generated.

18. The at least one non-transitory computer readable medium of claim 17, wherein the instructions, when executed, cause the at least one processor to execute the security investigation model based on at least one of the security threat object, the first security software product, the second security software product, and the collision.

* * * * *